United States Patent [19]

Preniczny et al.

[11] 4,147,241
[45] Apr. 3, 1979

[54] STRUCTURALLY STRONG HEAT INSULATOR FOR HIGH TRANSIENT TEMPERATURES

[75] Inventors: Robert B. Preniczny; Benjamin C. P. Han, both of South Bend, Ind.

[73] Assignee: The Bendix Corporation, Southfield, Mich.

[21] Appl. No.: 846,003

[22] Filed: Oct. 27, 1977

[51] Int. Cl.² .......................................... F16D 65/847
[52] U.S. Cl. ..................... 188/264 G; 192/113 A; 428/594; 428/613; 428/920
[58] Field of Search ........................... 188/73.5, 264 G; 192/113 A; 428/593, 594, 604, 603, 630, 613, 920

[56] References Cited

U.S. PATENT DOCUMENTS

| | | | |
|---|---|---|---|
| 2,801,714 | 8/1957 | Dotto | 188/264 G |
| 3,010,543 | 11/1961 | Pear, Jr. | 188/264 G |
| 3,269,491 | 8/1966 | Belart et al. | 188/72.7 X |
| 3,376,959 | 4/1968 | Holcomb, Jr. et al. | 188/196 R |
| 3,502,004 | 3/1970 | Schroder | 188/264 GX |
| 3,900,629 | 8/1975 | Spencer | 428/593 |

*Primary Examiner*—George E. A. Halvosa
*Attorney, Agent, or Firm*—Leo H. McCormick, Jr.; Ken C. Decker

[57] ABSTRACT

A structurally strong heat insulator is depicted in the backing plate and pressure plate regions of an aircraft multiple disc brake assembly. The insulator is constructed from a plurality of perforated metal sheets in order to withstand the large compressive forces experienced during a brake application. The sheets are compiled randomly into an insulating stack which thereby offsets the holes in adjacent sheets. The holes decrease the surface area and the offset increases the heat conduction path, both which reduce the amount of heat cnducted through the stack.

10 Claims, 10 Drawing Figures

STRUCTURALLY STRONG HEAT INSULATOR FOR HIGH TRANSIENT TEMPERATURES

BACKGROUND OF THE INVENTION

The present invention relates to the broad class of compact thermal insulators and more particularly to those insulators capable of withstanding large compressive forces at high temperatures.

The preferred embodiment of the present invention is designed for an aircraft brake, in which extreme transient temperatures, after reaching 2000° F., and hydraulic pressure to 3000 psi are common during a brake application. Under certain operating conditions, such as an aborted or rejected take off (RTO), the braking effort results in very high temperatures in the rotor and stator discs. Due to requirements for increased performance and fuel economy, various components of the aircraft have been made out of lighter metals such as aluminum and titanium. The strength of these metals, however, is somewhat adversely affected by the extreme heat conducted across their surfaces which interface with the rotor and stator discs while high heat generation occurs during a brake application. Various heat shields, thermal insulators, and air or water cooling techniques have been proposed to reduce the extreme temperatures attained by these metals and to prevent heat transfer into these metals.

SUMMARY OF THE INVENTION

There are many types of thermal insulators; however, each insulator has certain thermal and structural limitations that define its useful environment. The present invention was designed to fit a particular need in the aircraft brake environment, but it is certainly not limited to such use. Aircraft wheel and brake assemblies include various structural components which must be protected against high temperatures. For example, hydraulic fluid cannot exceed 300° F.; titanium begins to lose its strength above 800° F.; and aluminum begins to lose its strength above 400° F.

One embodiment of the present invention includes a heat shield or thermal insulator disposed adjacent the backing plate of an aircraft brake where large compressive forces are experienced. Also, the aforementioned well-known design requirements of aircraft brakes require that the axial length and weight of any component used in the torque tube area be minimized so that the axial length of the friction material may be maximized. This is especially important with carbon composite rotors and stators which are now being introduced to aircraft brakes in order to realize minimum brake operating costs. The weight requirements for these brakes on certain aircraft have necessitated the use of titanium for the torque tube and backing plate. The embodiment shown herein has a titanium backing plate assembly integral with a titanium torque tube; however, other arrangements, such as using bolts to secure the backing plate to the torque tube, are well known in the art. Titanium is very desirable because of its light weight; however, its strength weakens at temperatures above 800° F. and it tends to "creep" under loads such that in this torque tube-backing plate configuration, the backing plate would bend outward, away from the rotors and stators while the torque tube would also stretch or elongate, thereby adversely affecting the frictional engagement of the rotors and stators. The limited axial envelope of the torque tube necessitates a light, compact, yet structurally strong insulator in order to reduce heat conduction from the rotors and stators during a brake application into the titanium backing plate and thereby into the titanium torque tube.

Another embodiment illustrates the use of the present invention at the piston-pressure plate interface of an aircraft brake, thereby reducing the temperatures experienced by the piston assembly and the hydraulic fluid.

The present invention provides a compact, light weight, thermal insulator that can withstand extreme temperatures and compressive forces. The insulator is composed of several layers of a perforated sheet metal. The perforations or holes in each sheet are staggered in order to evenly reduce the metal surface area on each side of the sheet. This hole spacing allows for evenness in structural strength and prevents hot spots during heat conduction. The layers of perforated sheets are arranged to offset the holes between adjacent sheets. This offset may be done precisely or at random; however, the random method does not completely block the air in the holes as explained hereinafter. For the illustrated use at the titanium backing plate, it was found sufficient to use five layers randomly offset. The thermal insulation characteristics are developed from the reduced surface area of the metal, the low thermal-conductivity of the entrapped air between the layers, the interface resistance between each sheet and the lengthened heat conduction path around the holes. Because the present invention can be made from steel sheets, it can withstand large compressive forces and thereby can be used to insulate structural parts under large mechanical load.

The present invention is relatively inexpensive because steel perforated sheets are commercially available in a variety of thicknesses and hole configurations. Additional expense is minimized if the random sheet offset method provides the desired thermal conduction characteristics.

The preferred embodiment of the present invention is depicted as being encapsulated by a cover and bottom portion because in an aircraft brake environment, it is undesirable to have open, non-solid, components that could have fragments break off and possibly wedge between adjacent frictional interfaces. The cover and bottom, however, do not reduce the large compressive forces experienced by the perforated sheets.

It is an object of the present invention to provide a heat conduction insulator that is compact, light in weight and can withstand extreme temperatures and compressive forces.

Another object of the present invention is to provide a heat conduction insulator that has a relatively small thickness or axial distance so that it can be used in the axial envelope of an aircraft wheel and multiple disc brake assembly.

Another object of the present invention is to provide a heat conduction insulator that has a reduced material contact surface area and lengthened heat conduction path.

DESCRIPTION OF THE PREFERRED EMBODIMENT

Figure 1:
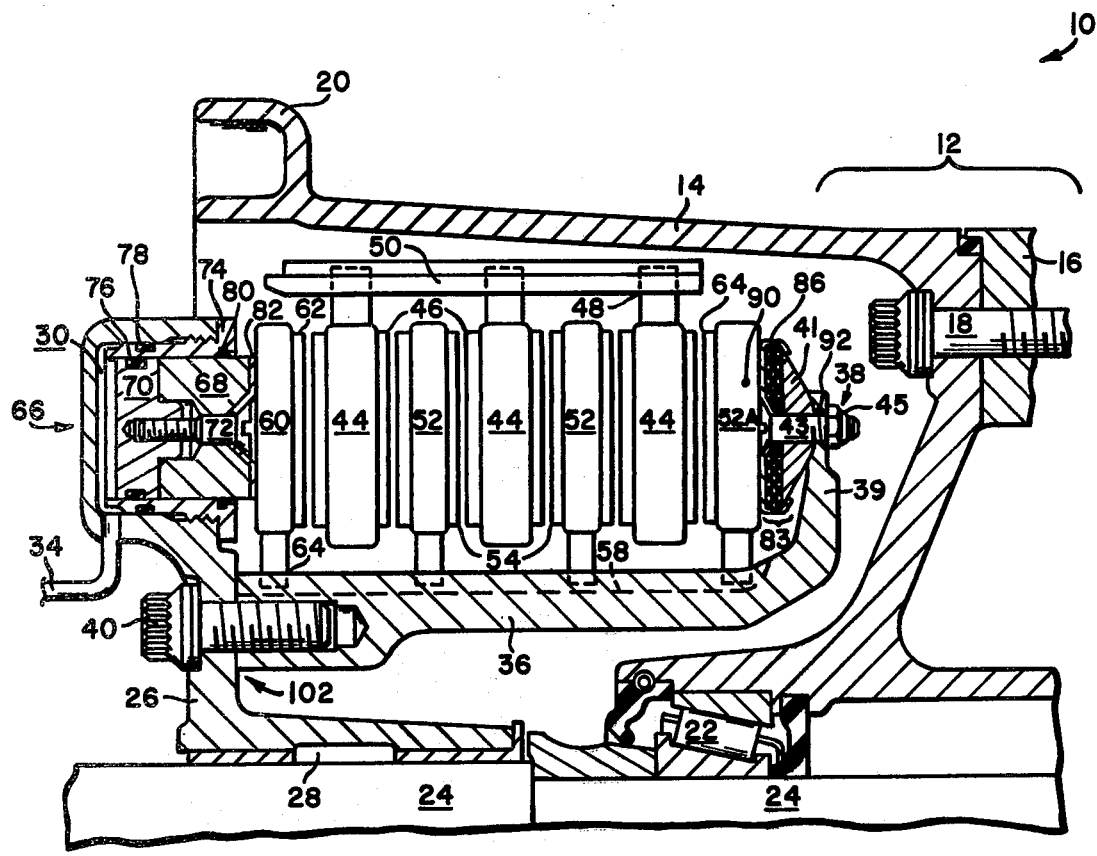
FIG. 1 is a sectional schematic representation of a conventional aircraft wheel and multiple disc brake assembly containing an embodiment of the present invention at the backing plate.

Referring to FIG. 1, numeral 10 designates a conventional aircraft wheel and multiple disc brake assembly. Assembly 10 includes a wheel 12 defined by two annular sections 14, 16, only one of which is fully shown, fastened together by circumferentially spaced-apart bolts and nuts generally indicated by 18. Each wheel section 14, 16, has a circumferential tire flange 20. Reference is made to U.S. Pat. Nos. 2,990,216 and 2,998,282 for a detailed discussion of the wheel construction. The wheel 12 is rotatably journaled by bearing means 22 on a nonrotatable fixed axle 24 carried by conventional aircraft landing gear structure, not shown. An annular brake carrier 26 is secured in a nonrotatable position relative to the wheel by any suitable means known to those skilled in the art; the method shown is by using conventional keys or splines 28 to directly secure carrier 26 to the nonrotatable fixed axle 24.

Two other common methods, not shown, are generally known as flanged mounting, wherein carrier 26 is bolted to a flange member secured to axle 24 and torque arm mounting, wherein carrier 26 is fixed in its position relative to the wheel 12 by a torque arm member secured directly to the landing gear structure. The brake carrier 26 is provided with a plurality of circumferentially spaced-apart cavities 30, only one of which is shown. Cavities 30 are fluidly connected via passage 34 to a source of pressurized fluid, not shown, controlled by the aircraft pilot.

A generally cylindrical torque tube 36 having an integral annular backing plate assembly, generally indicated as 38, is fixedly secured to carrier 26 by a plurality of circumferentially spaced-apart bolts 40. Backing plate assembly 38 is shown as being of the well-known self-aligning configuration having an annular member 39 and a plurality of circumferentially spaced-apart self-aligning members 41, only one of which is shown. The annular member 39 is shown as being integral with torque tube 36. Each self-aligning member 41 is pivotally secured to annular member 39 by bolt 43 and nut 45 and will be described more fully hereinafter.

A plurality of spaced-apart annular brake rotor members 44 having friction surfaces 46 on opposite axial faces thereof are suitably keyed at 48 to a plurality of circumferentially spaced-apart key or retaining members 50. The retaining members 50 are fixedly secured to wheel section 14 and are adapted to permit axial movement of the rotor members 44 relative to wheel section 14 while rotating therewith.

A plurality of nonrotatable annular brake stator members 52 having friction surfaces 54 on opposite axial faces thereof are interleaved with the rotor members 44 and keyed at 56 to a plurality of circumferentially spaced-apart spline sections 58 of torque tube 36 for axial movement relative therealong. A pressure plate 60 is similar to stators 52, but only requires one friction surface 62. Pressure plate 60 is also suitable keyed at 64 to spline sections 58 for axial movement therealong. In the brake configuration shown in FIG. 1, the backing plate 38 does not require a friction surface because the adjacent stator 52A does not rotate. Stator 52A, like pressure plate 60, is identical to other stators 52 except that they need only one friction surface 62, 64, respectively. There are, however, other well-known backing plate configurations that require a friction surface.

A plurality of fluid pressure responsive piston assemblies, generally indicated as 66, are disposed in cavities 30 and bear against the pressure plate 60. The pressure responsive piston is composed of two parts, outer piston 68, which is composed of a nonmetallic insulator material, and inner piston 70, which is composed of a conventional metal suitable for fluid pressure sealing surfaces, usually an aluminum alloy to reduce the weight. The pistons 68, 70 are coaxially secured together by screw 72 threaded into inner piston 70 and are slidably contained by sleeve 74, threadedly engaged with carrier 26. Fluid pressure seals 76, 78 are contained in suitable annular recesses in piston 70 and sleeve 74, respectively. Conventional dust wiper seal 80 is secured to sleeve 74 to prevent dirt or debris from entering the slidably engaged surfaces of pistons 68, 70 and sleeve 74. An abrasion shield 82 is secured to the outer piston 68 by screw 72 and is used to retard heat transfer from pressure plate 60 into piston 68 during a brake application.

Brake adjusting and retraction units, not shown, are contained in circumferentially spaced-apart holes in carrier 26 secured to the pressure plate 60. The construction and operation of both piston means 66 and adjusters are well known in the aircraft brake art and have many other embodiments. Reference is made to U.S. Pat. No. 3,376,959 for a detailed discussion of the adjusters. For the purposes of this disclosure, it is sufficient to understand that upon a brake application, pistons 66 and simultaneously pressurized thereby axially displacing pressure plate 60 towards backing plate 38. The axial displacement of pressure plate 60 compresses all the frictional surfaces 46, 54, 64, and 62 of the rotor members 44, stator members 52, 52A, and pressure plate 60, respectively, into engagement, thereby retarding the rotation of the wheel 12. Pistons 66 are adapted to have an axial travel sufficient to compensate for the accumulated axial wear of the friction surfaces. Upon brake depressurization, the pressure plate 60 and thus pistons 66 are axially retracted a predetermined distance under the influence of the brake adjusters thereby establishing a corresponding brake running clearance between adjacent surfaces of the brake assembly. The adjusters also serve to automatically axially advance the pressure plate 60 to compensate for wear of the frictional surfaces.

There are many compositions and configurations of frictional surfaces 46, 54, 62, and 64 known in the brake art. Reference is made to the following U.S. patents, for examples of semi-metallic composition and structure:

U.S. Pat. Nos. 3,037,860; 3,237,731; 3,269,489; 3,376,960; 3,473,635; and 3,844,801 and for examples of carbon composition and structure: U.S. Pat. Nos. 3,473,637; 3,650,357; 3,891,066; 3,948,363; and 3,970,174. Although shown separately for emphasis, it is well known in the brake art that if the rotor and stator members 45, 52 are made of carbon composite material, the frictional surfaces 46, 54 are homogeneous with their corresponding rotor and stator members 44, 52. Also, pressure plate 60 and stator 52A can be made of carbon composite material which results in their corresponding friction surfaces 62, 64, respectively, being homogeneous with the pressure plate 60 and stator 52A.

Figure 2:
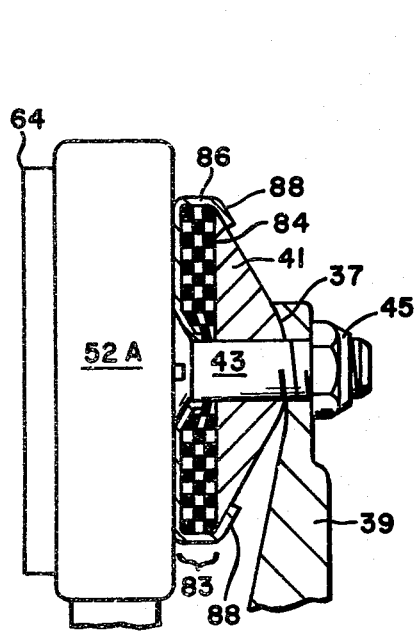
FIG. 2 is an enlarged view of the backing plate region of FIG. 1.

The aforementioned desire to reduce weight has necessitated the use of titanium for the torque tube 36 and annular member 29 and that poses the aforementioned "creeping" problem. In order to minimize the heat transfer into the titanium, applicants' invention is shown in FIGS. 1 and 2 as being contained on the self-aligning member 41, thereby providing a thermal interface between member 39 and stator 52A. This thermal interface is created by an insulating stack 83 comprising a plurality of perforated stainless steel sheets 84 described in detail hereinafter with respect to FIGS. 3-5. The stack is enclosed by a stainless steel abrasion shield 86, like shield 82. Shield 86 has a plurality of circumferentially spaced tabs 88 that are bent over member 41 in order to maintain the complete encapsulation of stack 83. The tabs 88 do not interfere with the force transmitting relationship between the annular surface area 89 of shield 86, the stack 83 and the self-aligning member 41. The encapsulated stack and self-aligning member 41 are designed to be a single unit pivotally held by screw 43 and lock nut 45 against curved portion 37 of annular member 39.

The braking forces generated by piston 66 are transmitted generally in the axial direction along torque tube 36 and from stator 52A through the insulating stacks 83 to member 39. Therefore, each sheet 84 must be capable of withstanding the high compressive forces and many insulating materials were found unsuitable in this environment. Insulating material like that used for outer piston 68 was also found unsuitable, although capable of withstanding the compressive forces, it required too much axial distance in the brake envelope and showed signs of deterioration at the extreme temperatures.

The basic Fourier conduction law is:

$$dq = -kdA \, (dt/dL)$$

which states that the steady rate, dq, of heat conduction is proportional to the cross-sectional area dA normal to the direction of flow and to the temperature gradient $-(dt/dL)$ along the conduction path, L. In the equation:

q = rate of heat flow in BTU/hr
t = temperature in degrees F.
L = thickness of conduction path normal to the temperature gradient function in feet
A = area of heat transfer surface in the plane normal to the heat conduction path in square feet
k = thermal conductivity of material which also varies with temperature; generally, for metals K decreases with increasing temperature and the reverse is true for other materials.

Because of the aforementioned limited axial envelope for the brake there was need for a relatively thin insulator that could withstand high compressive forces. Applicants' invention provides such an insulator and is shown in detail with respect to FIGS. 3-5. By virtue of the above equation, applicants sought to decrease the heat transfer by decreasing the surface area "A" and at the same time increasing the heat conduction path, "L."

The design characteristics of the aircraft brakes limit the brake envelope's axial distance and the force requirements. These force requirements thereby set the limits for the number of circumferentially spaced self-aligning members and the surface area thereof. Applying these design limitations to the above-stated heat conduction equations yields maximum limitations on the length, and minimum limitations on the surface area. Therefore, applicants invented an insulator that stays within the above-stated requirements but reduces the thermal surface area "A" and lengthens the thermal heat conduction path, "L" to reduce the overall thermal conduction through the insulator stack.

Figure 3:
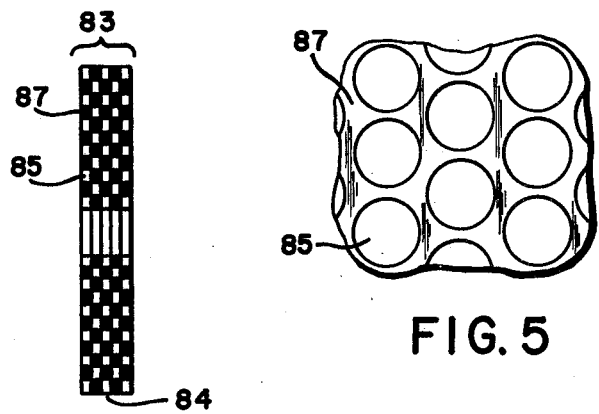
FIG. 3 is an enlarged view of the present invention.
Figure 5:
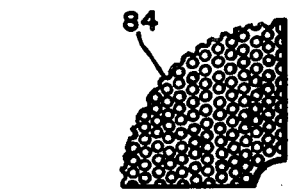
FIG. 5 is an enlarged view of a portion of the surface area shown in FIG. 4 which indicates applicants' staggered hole arrangement.
Figure 4:
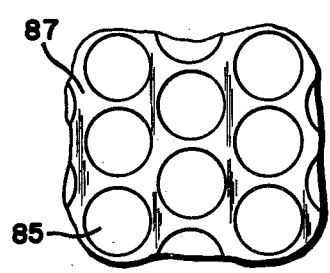
FIG. 4 is a partial front view of the invention presented in FIG. 3.

FIG. 3 indicates a cross section of a stack 83 comprising five perforated sheets 84. The light portions 85 indicate holes surrounded by dark portions 87 being solid metal. As shown in FIG. 3 the holes 85 of each sheet 84 of the stack are offset from the holes 85 of the adjacent sheets and abut metallic portions 87 of adjacent sheets. This perfect hold offset arrangement traps air in between the sheets thereby increasing the thermal insulation. This perfect offset arrangement can be accomplished with a proper hole selection and exact sheet alignment. To minimize the cost, applicants used a commercially available perforated sheet having the holes staggered, which provided sufficient insulation for the illustrated uses as indicated by FIGS. 4 and 5. As can be seen from FIG. 5, applicants' sheets have large holes as compared to the amount of metal remaining between them and will not provide the perfect offset as indicated in FIG. 3 even when carefully staggered. Although air is not completely trapped between adjacent sheets the holes reduce the surface area and the random arrangement between adjacent sheets of the stack increases the conduction path around the holes. The sheets chosen by applicants have fifty percent of their surface area in holes, termed 50% open. The terms "staggered" and "perforated" as used herein are, to applicants' knowledge, terms generally used by companies manufacturing these types of sheets. Holes are also termed being in "straight" formation, instead of staggered and the holes themselves appear in many sizes and shapes; for example, sheets have surface areas ranging from 18% and 65% open and hole shapes include round, square, oblong, cone, star, cloverleaf, ripple, combination, etc. The Harrington & King Perforating Co., Inc. is one such company known to manufacture these types of sheet material. Applicants' invention can be practiced with any of the above types of perforated sheets.

Figure 10:
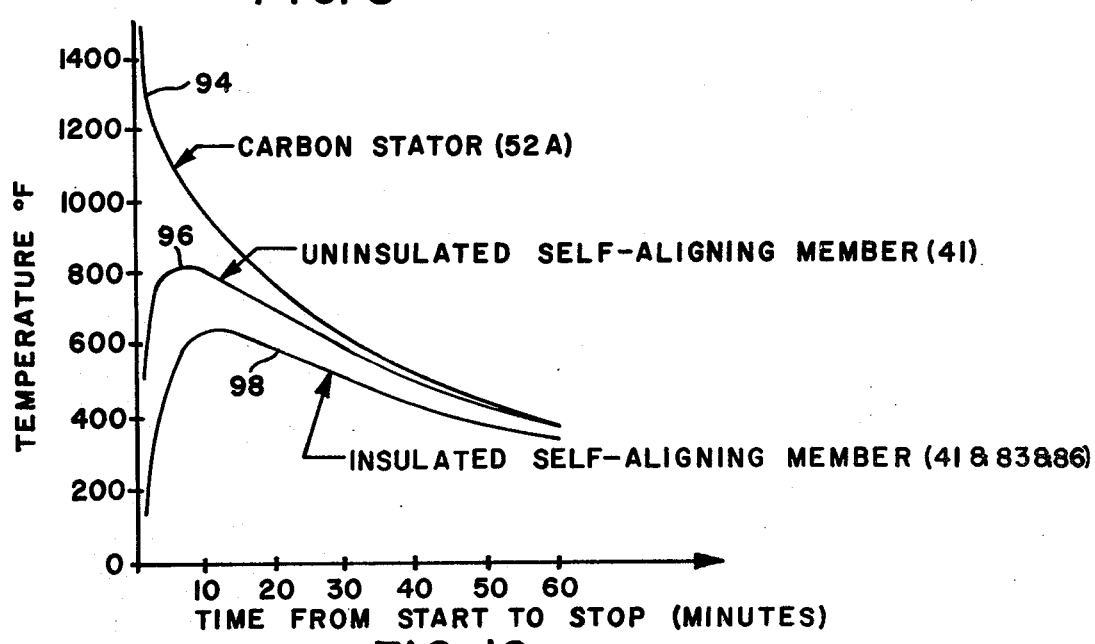
FIG. 10 is a graph indicating the temperatures of the backing plate region with and without the present invention.

Applicants performed numerous experimental tests on their invention and sample results are shown on the graph of FIG. 10. Thermocouples were placed on a carbon composite aircraft brake assembly at the approximate locations 90, 92 to measure the temperature of the stator 52A and the backing plate member 39. Line 94 indicates the transient temperature of the stator 52A after a simulated severe brake application. Line 96 indicates the temperature rise and decline of an uninsulated self-aligning member 41. Line 98 indicates the temperature use and decline of a self-aligning member insulated by applicants' invention having 5 sheet members 84 enclosed by shield 86. From the graph it is evident that applicants' invention not only reduces the peak transient temperature, but increases the time lag in arriving at the reduced peak temperature. Although applicants' invention only reduces the heat transfer a small amount when compared to excellent insulating materials, none of those insulating materials could meet the axial length requirement and withstand the large compressive forces.

Figure 6:
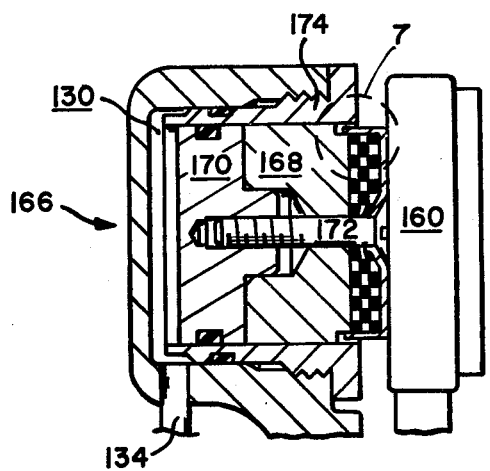
FIG. 6 is an enlarged view of the piston assembly of FIG. 1 adapted to contain an embodiment of the present invention.
Figure 7:
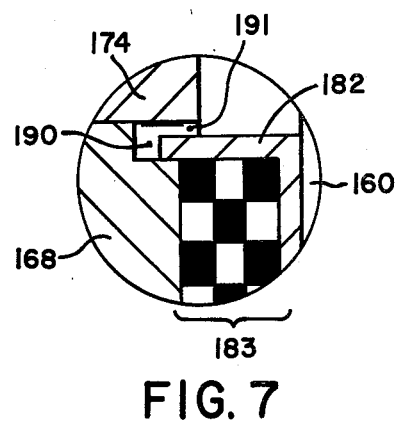
FIG. 7 is an enlarged view of the circumscribed portion 7 of FIG. 6 which indicates an arrangement for securing the abrasion shield over the present invention.

Applicants' invention has many other applications. Two other embodiments are depicted in FIGS. 6–9 and utilize the present invention at the end of the pressure responsive piston assembly 66 in order to reduce heat transfer into the fluid from the pressure plate 60. The two piston assembly embodiments 166, 266 are similar to that described in FIG. 1 and like parts are shown with the addition of 100 and 200, respectively. The embodiment of FIG. 6 is very similar to that of FIG. 1 except that the outer piston 168 has a shorter axial length to accomodate the thickness of the insulation stack 183. As mentioned before, the outer piston 168 is made from a material that has shown some deterioration from the extreme heat which the addition of applicants' invention will now prevent. FIG. 7 indictes that the abrasion shield 182 is modified to encapsulate the stack 183 and provide clearances 190, 191 from the outer piston 168 and sleeve 174, respectively. These clearances are designed to prevent scoring of the cylindrical surface of sleeve 174 and allow the stack 183 to transmit the brake application forces without having shield 182 dig into piston 168.

Figure 8:
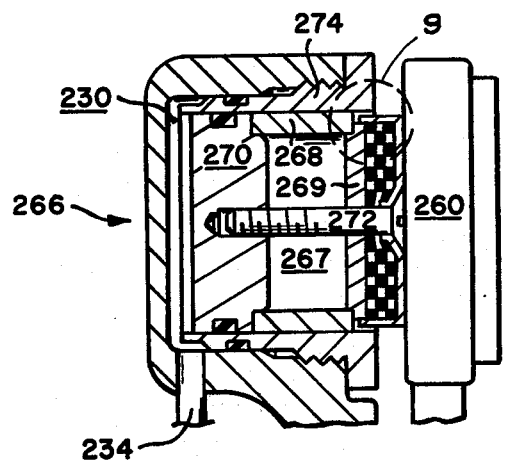
FIG. 8 is another enlarged view of the piston assembly of FIG. 1 adapted to contain a further embodiment of the present invention.
Figure 9:
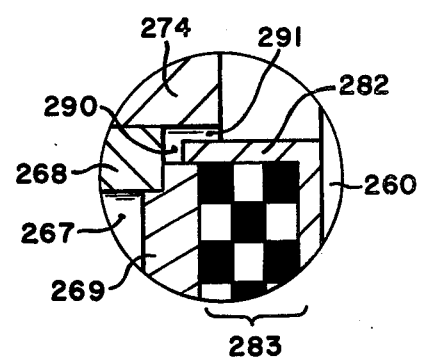
FIG. 9 is an enlarged view of the circumscribed portion 9 of FIG. 8 which indicates an arrangement for securing the abrasion shield over the present invention.

The embodiment of FIG. 8 utilizes a hollow steel cylindrical member 268 as the outer piston 68 of FIG. 1. Cap member 269 bears against the end of cylinder 268 to transmit the forces to the stack 283. The trapped air in area 267 acts as a further insulator in addition to the insulator stack 283. As in FIG. 7, FIG. 9 depicts the modification to abrasion shield 282 which allows for clearances 290, 291.

Many other configurations and uses of the insulator stack are possible without deviating from applicants' invention as recited in the claims. For example: the aforementioned hole configuration is commercially available in sheets having a variety of hole patterns, the number and size of sheets may be varied depending upon the space and thermal requirements, the thickness of each sheet in the stack may be varied, adjacent sheets may be made from different materials, or the hole patterns of adjacent sheets may be different. Also, applicants' invention could be constructed into thermal washers that could be used to insulate the interfaces between structures subjected to large mechanical forces, such as at the interface point 102 of FIG. 1 where the torque tube 36 is secured to the carrier 26 by bolts 40.

We claim:

1. An aircraft wheel and multiple disc brake assembly having:
    a wheel member to be braked rotatably mounted on said aircraft;
    torque-absorbing means mounted on said aircraft for effectuating said braking of said wheel, said torque-absorbing means including a backing plate member, an axial member, and a pressure plate member axially slidable along said axial member;
    rotor members and stator members located between said pressure plate member and said backing plate member, said rotor and stator members being axially slidable on said wheel member and said axial member, respectively, whereby the engagement thereof causes said braking of said wheel member; and
    brake application means secured to said torque-absorbing means for urging said pressure plate member toward said backing plate member when a brake application is effected, thereby compressing said rotor and stator members between said backing plate member and said pressure plate member, said compressing of the rotor and stator members resulting in generation of heat when the wheel member is rotating, some of said heat being conducted from said rotor and stator members into said backing plate member, wherein the improvement comprises first insulation means secured to said backing plate member and connected to one of said rotor and stator members for receiving said brake application forces and for controlling the conduction of heat to said backing plate member, said first insulation means having a first plurality of sheet members defining a first insulation stack, each of said sheet members having a defined thickness of material to create opposite heat conduction surface areas at the ends of said material thickness, said first insulation stack having said surface areas adjacent said sheet members bearing against one another with one of said surface area of one of said sheet members defining the top of said first insulation stack and one of said surface area of another said sheet members defining the bottom of said first insulation stack, said top receiving said brake application forces and said heat and said bottom transmits the same to said backing plate member, each of said sheet members having a plurality of holes passing completely through its said material thickness to reduce the amount of said material on both of said surface areas of said sheet members, said first insulation stack having at least some of said holes of said sheet members at least partially offset from said holes of adjacent sheet members whereby those of said offset holes abut some of said material of said adjacent sheet members to increase the length of the heat conduction path through said first insulation stack and thereby reduce the overall conduction of heat from said rotor or stator members into said backing plate member to allow the generation of temperature up to 1500° F. in said rotor and stator members without damage to said backing plate member.

2. An aircraft wheel and multiple disc brake assembly as claimed in claim 1, wherein:
    said stack has said sheet members placed in said stack at random thereby achieving said hole offset at random.

3. An aircraft wheel and multiple disc brake assembly as claimed in claim 2, wherein:
    each said sheet member is of the same thickness and made from the same material; and
    each said sheet member having its holes spaced in a predetermined pattern.

4. An aircraft wheel and multiple disc brake assembly as claimed in claim 1 further including:
    first encapsulating means for completely surrounding said first insulation stack, said encapsulating means having a first member covering said bottom surface area of said stack and a second member extending over said top surface area of said stack into engagement with said first member, said first and second members bearing against said bottom and top surface areas, respectively, in a force transmitting relationship whereby said brake application forces are distributed from said second member to said top surface area and thereon through said first insulation stack and said first member into said backing plate member, said first encapsulating means retaining any fragments of said first insulation stack they may spall off as a result of the transfer of heat therethrough and thereby prevent the degradation of the rotor and stator members by such fragments.

5. An aircraft wheel and multiple disc brake assembly as claimed in claim 4, wherein:
each said sheet member of said stack and said first and second members are made of stainless steel.

6. An aircraft wheel and multiple disc brake assembly as claimed in claim 4, wherein:
said first encapsulating means is pivotally secured to said backing plate member.

7. An aircraft wheel and multiple disc brake assembly as recited in claim 4 further including:
second heat insulating means disposed between said brake application means and said pressure plate member, said second insulation means having a second plurality of insulating sheet members defining a second insulation stack, each of said sheet members having a defined thickness of material to create opposite heat conduction surface areas at the ends of said material thickness, said second insulation stack having said surface areas of adjacent said sheet members bearing against one another with one of said surface area of one of said sheet members defining the top of said second insulation stack and one of said surface area of another of said sheet members defining the botton of said second insulation stack, said top receiving brake application forces and said heat and said bottom transmits the same to said pressure plate member, each of said sheet members having a plurality of holes passing completely through its said material thickness to reduce the amount of said material on both of said surface areas of said sheet members, said second insulation stack having at least some of said holes of said sheet members at least partially offset from said holes of adjacent sheet members whereby those of said offset holes abut some of said material of said adjacent sheet members to increase the length of the heat conduction path through said second insulation stack and thereby reduce the overall conduction of heat from said rotor and stator member into said pressure plate member to allow the generation of temperatures up to 1500° F. in said rotor and stator members with damage to said pressure plate.

8. An aircraft wheel and multiple disc brake assembly as claimed in claim 7, further including:
second encapsulating means for completely surrounding said second insulation stack, said second encapsulating means having a first shield member covering said bottom surface area of said second insulation stack and a second shield member extending over said top surface area of said stack into engagement with said cap member, said second shield member and cap member bearing against said bottom and top surface areas, respectively, in a force transmitting relationship whereby said brake application forces are distributed from said cap member to said top surface area and thereon through said stack and said shield member into said pressure plate member, said second encapsulating means retaining any fragments of said second insulation stack that may spall off as a result of the transfer of heat therethrough and thereby prevent the degradation of the rotor and stator members by such fragments.

9. An aircraft wheel and multiple disc brake assembly as claimed in claim 7, wherein:
said brake application means includes:
a housing secured to said torque-absorbing means, said housing having a cavity therewithin;
a fluid pressure responsive first piston member axially slidable in said cavity for effectuating said brake application;
a second piston member operatively engaged with said first piston member for transmitting said brake application forces from said first piston member to said insulating means, said second piston member being a hollow metallic cylinder having a cap member for providing an annular surface area that transmits said brake application forces to said insulating means.

10. An aircraft wheel and multiple disc brake assembly as claimed in claim 9, wherein:
said first piston member is made of aluminum alloy metal; and
said second piston member and said cap member are made of stainless steel.

* * * * *